United States Patent Office 3,586,665
Patented June 22, 1971

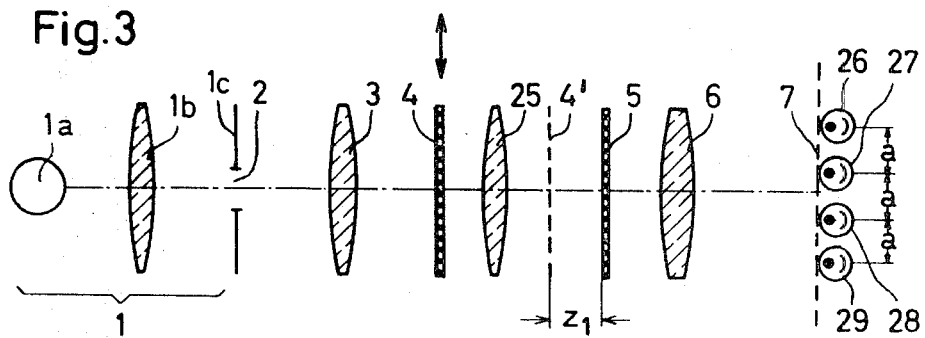
Fig. 3
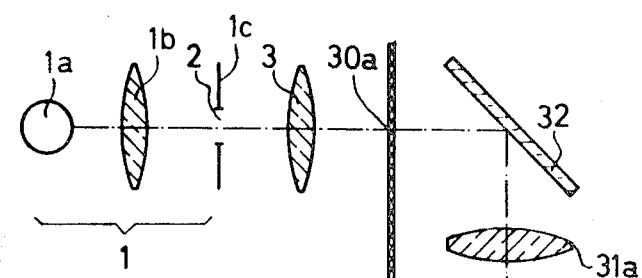
Fig. 4
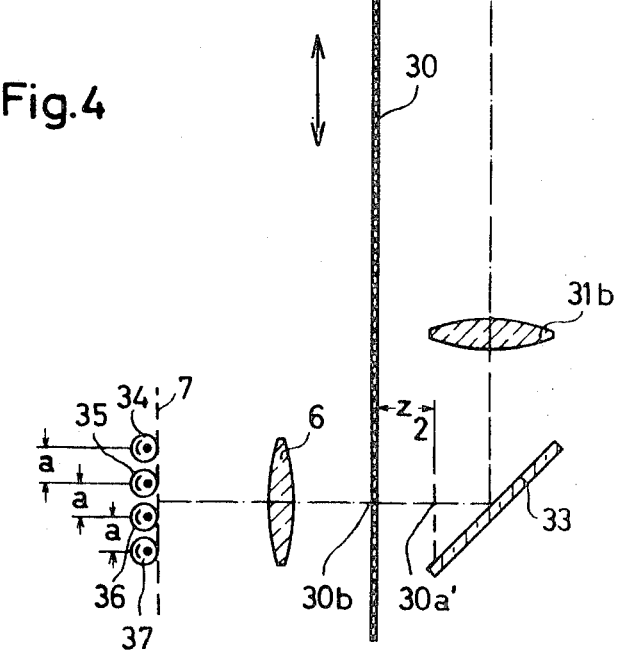

3,586,665
APPARATUS FOR PRODUCING PHASE-SHIFTED ELECTRIC SIGNALS
Adolf Weyrauch, Aalen, Germany, assignor to Carl Zeiss Stiftung, Wurttemberg, Germany
Filed Apr. 23, 1970, Ser. No. 31,329
Claims priority, application Germany, Apr. 26, 1969,
P 19 21 507.7
Int. Cl. G01d 5/34
U.S. Cl. 250—231  7 Claims

ABSTRACT OF THE DISCLOSURE

In apparatus for producing phase-shifted electric signals representing the positions of a moving element, light from a source passes through similar first and second gratings, at least one of which moves back and forth in line with the direction of the widths of the grating slits in correspondence with movements of the moving element, and through a lens that focusses the resulting diffraction image on a row of photoelectric receivers in the focal plane of the lens. The second grating is spaced from the first grating (i.e., the grating itself or its projected image). The distance $a$ between projections of the centers of the receivers on a reference line which is at right angles to the direction of the lengths of the grating slits is $$a = \frac{wf\phi}{2\pi Z}$$

where $w$ is period length of the grating slits, $Z$ is the length of the optical path from the first grating (the grating itself or its projected image) to the second grating, $f$ is the focal length of the lens, and $\phi$ is the desired phase shift of signals produced by the photoelectric receivers, as measured in radians.

SUMMARY AND BACKGROUND OF THE INVENTION

The present invention is apparatus for producing phase-shifted electric signals, the apparatus being adapted for use in combination with a moving element, such as a machine part, for producing electric signals whose phase is shifted in correspondence with movements of the element. In particular, the apparatus of this invention utilizes a light source, and two diffraction gratings in combination with a leans for projecting a diffraction image on a row of photoelectric receivers in the focal plane of the lens.

As known, at least two phase-shifted measuring signals are required in photoelectric tracking apparatus for identifying the direction of the measuring process. And, for the production of such signals, it is known to move one diffraction grating relative to another to produce a compound diffraction image.

In one form of apparatus of this general type light passing through the diffraction gratings is split by divider lens and to project each portion onto a photodiode. A problem with this form of apparatus, however, is that signals generated by light from different zones of the gratings differ in amplitude and in wave form.

In another form of such apparatus an imaging system utilizing a birefringent medium or a dispersing medium is arranged between the two gratings to project partial images of the first grating onto second. The two partial images, which are of different polarization, or of different color components, depending on the medium used, are then scanned by the second grating. When the birefringent media are used, only two separate images are produced; when dispersing media are used, at most four separate images are produced, and in the latter case photoelectric receivers with different spectral sensitivity are required.

A principal object of the present invention is to provide apparatus of the subject type wherein phase-shifted signals are produced from light waves which are scanned by a diffraction grating and in which a special imaging system incorporating birefringent media and/or dispersion media in front of the scanning grating are not required.

In accordance with the invention a diffraction image produced by projecting light through a pair of slit-type diffraction grating is focussed by a lens on a row of photoelectric receivers which are spaced apart in the focal plane of the lens. At least one of the gratings is moved in timed relation with movements of a moving element, such as a machine part, the amount and direction of whose movements it is desired to measure.

In apparatus of this invention a plane wave front from the light source is split by the first measuring diffraction grating into several plane wave fronts corresponding to the diffraction orders of the grating. These several wave fronts are again split by the second grating so that the signals produced by focussing the resultant diffraction image on the photoelectric receivers results from superimposing the parallel wave fronts. The light from the source is preferably projected onto the first grating as an elongated bar of light that is oblique with respect to the lengths of the slits of the gratings; the photoelectric receivers are correspondingly spaced apart in an oblique row as means for providing a maximum number of separate receiving surfaces along a line at right angles to the lengths of the slits of the diffraction gratings.

The light source may also be provided in the form of several separate light sources corresponding in number and arrangement with the number and arrangement of the receivers. These several light sources are suitably provided by optical fiber light conductors, and receivers and light sources are preferably dimensioned so that the size of the images of the light sources as received at the receivers correspond to the sizes of the receiving surfaces of the respective receivers.

In addition to the simple construction of apparatus of this invention, the structure of the apparatus makes it possible to produce a greater number of phase-shifted signals from a single scanning field than possible with previous known apparatus of this general type.

In accordance with the invention the several photoelectric receivers are equally spaced apart so that the distance $a$ between projections of their centers on a reference line which is at right angles to the direction of the length of the grating slits is $$a = \frac{wf\phi}{2\pi Z}$$

where $w$ is the width of each grating slit, $Z$ is the length of the optical path from the image plane of the first grating (i.e., the surface of the output side of the first grating or a projected image thereof) to the second grating $f$ is the focal length of the lens, and $\phi$ is the desired phase shift of the signals produced by the photoelectric receivers as measured in radians.

The derivation of the foregoing mathematical definition of $a$ is obtained as follows.

The wave fronts referred to herein are defined by the normals which coincide with the directions of the rays from the light source. If the incident rays have the direction $\sigma$, and $w$ is the period length of the grating slits, the diffraction of the nulls is likewise at $\sigma$ and the diffraction of wave portions other than the nulls are at $\sigma + n\lambda/w$, assuming there is sufficient accuracy for $$\sin\frac{n\lambda}{w} = \frac{n\lambda}{w}$$

by displacing the grating in the direction V, the diffraction of the $n$th wave portion provides a phase shift of $2\pi nv/w$ so that the factor $e^{i12\pi nv/w}$ must be added to the amplitude coefficient $a_n$.

If the length of the optical path between the two gratings is Z, the change of the phase position of the individual wave fronts after the diffraction by the first grating must be taken into account at the second grid. For an optical path length equal to the length of the $n$th wave portion the mathematical relationship is:

$$Z_n = Z \cos(\sigma + n\lambda/w) \simeq Z\left(1 - \frac{(\sigma + n\lambda/w)^2}{2}\right)$$

and for the amplitude of the signal of the $m$th wave portion:

$$S_m(v) = \sum_{-\infty}^{+\infty} a_{n1} a_{(m-n)2} e^{i2\pi\left[nv/w + Z/\lambda 1\right) - \frac{(\sigma + n\lambda/w)^2}{2}\right]}$$

where $a_{n1}$ denotes the amplitude coefficients of the first grating and $a_{(m-n)2}$ those of the second grating.

Simple transposition gives:

$$S_m(v) = e^{i2\pi z/\lambda(1-\delta^2/2)} \sum_{-\infty}^{+\infty} a_{n1} a_{(m-n)2} e^{-i2\pi n^2 \lambda z/2w^2} e^{i n2\pi/w(\lambda - z\sigma)}$$

The factor $e^{-2\pi n^2 \lambda z/2w^2}$ is independent of $\delta$ and determines the contrast of the intensity signal.

The factor $e^{i2\pi/wn(V-Z\sigma)}$ shows the phase shift by $$\phi = \frac{2\pi Z \sigma}{w}$$

If it is considered that $\sigma = a/f$, the resultant formula for $a$ is $$a = \frac{wf\phi}{2\pi Z}$$

Further objects, features and advantages of apparatus in accordance with this invention will be apparent from the following detailed description of illustrative embodiments of the invention shown in the accompanying drawings.

BRIEF DESCRIPTION OF THE DRAWINGS

In the drawings, forming a part thereof, in which like reference characters indicate corresponding parts in all the views:

FIG. 1b is a diagrammatic front view of the row of photoelectric receivers of the apparatus shown in FIG. 1a;

FIG. 3 is a diagrammatic cross-sectional view longitudinally through a third form of apparatus of the invention; and FIG. 4 is a diagrammatic cross-sectional view of a fourth form of apparatus of the invention.

Referring to FIG. 1a, in the embodiment illustrated, an illuminating system 1 consists of a light source 1a associated with a lens 1b and with a wall 1c, which has an elongated aperture 2 therethrough. A lens 3 is spaced from the aperture 2 the amount of its focal length $f3$ and aligned to project light from the aperture 2 onto the first in-line measuring diffraction grating 4 of a pair of slit-type diffraction gratings 4 and 5 through which the light passes and is successively diffracted. The first, measuring, grating 4 is mounted and connected by conventional means (not shown) to a moving element, such as a machine part (not shown) whose movements are to be tracked and measured by the apparatus; the grating 4 is connected to the moving element to be moved thereby in successively opposite direction, indicated by the double headed arrow. The second, scanning, grating 5 is relatively stationary.

Figure 1A:
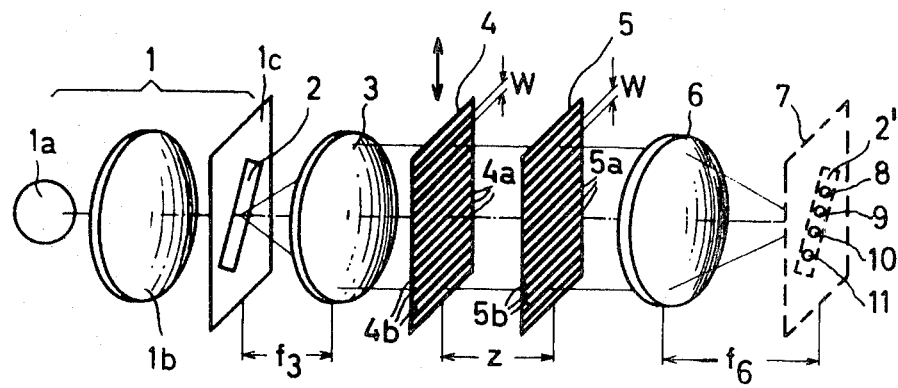
FIG. 1a is an isometric diagrammatic illustration of one form of apparatus embodying the present invention.

The two gratings 4 and 5 consist of light-impervious slats 4a, 5a spaced apart to provide light-transmitting apertures 4b, 5b which, are substantially the same period length (which is the grating constant) in both gratings. The slats 4a and 5a of the gratings are parallel to each other or are inclined slightly toward each other.

The scanning grating 5 is spaced from the measuring grating 4 so that the optical path between them is a length Z. A lens 6 which is in line with and beyond the scanning grating 5 produces a diffraction image 2' of the aperture 2 in its focal plane 7 that is its focal length $f6$ beyond the lens 6. A number of photoelectric receivers, 8, 9, 10 and 11 are arranged in a row in the focal plane 7 to produce electric signals from the diffraction image focussed thereon. The number of photoelectric receivers is not necessarily limited to four, but is determined by the number of receivers that can be accommodated within the longitudinal dimension of the elongated diffraction image 2' with their centers spaced apart the distance $a$, which is defined below. As shown the aperture 2, which defines the dimensions of the diffraction image 2', and the row of receivers 8 to 11 are preferably arranged oblique relative to the lengths of the apertures 4b, 5b of the gratings 4 and 5 as a means for increasing the number of photoelectric receivers that can be placed with their centers spaced the distance $a$ apart relative to a reference line that is at right angles to the direction of the length of the grating slits 4b, 5b.

Figure 1B:
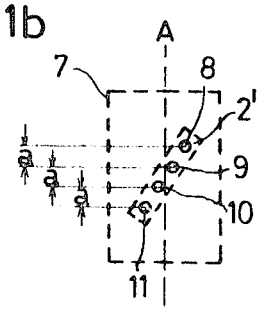

As illustrated in FIG. 1b, the distance $a$ between the centers of the receivers 8 to 11 is the distance between the centers as projected on a reference line $a$ that is vertical, and is thus at right angles to the horizontal grating slits 4b, 5b. The distance $a$ is defined by $$a = \frac{wf\phi}{2\pi Z}$$

where $w$ is the period length of the grating slit 4b, 5b (the grating constant), Z is the length of the optical path from the first grating 4 to the second grating 5, $f$ is the focal length of the lens 6, and $\phi$ is the desired phase shift of signals produced by the photoelectric receivers 8 to 11, as measured in radians.

In operation of the apparatus of FIG. 1a, as the measuring grating 4 moves the diffraction image 2' is traversed by an interference fringe system and successive signals produced by the receivers 8 to 11 differ from each other by the phase angle $\phi$.

Figure 2:
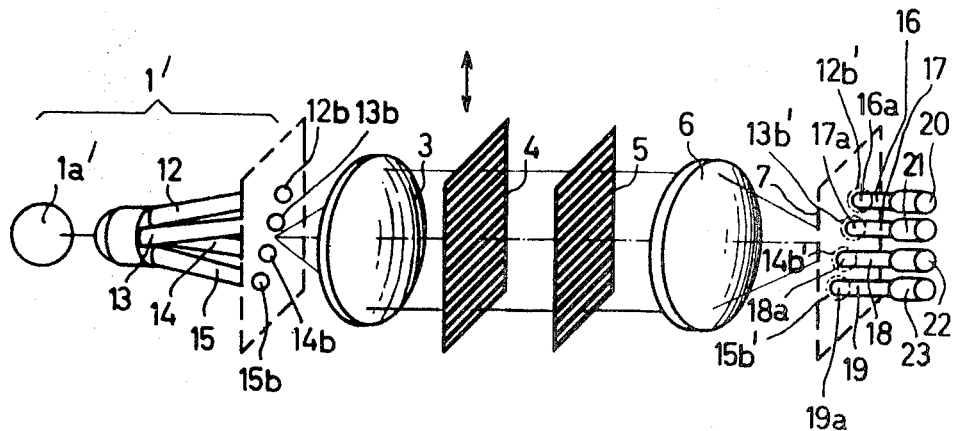
FIG. 2 is an isometric diagrammatic illustration of a second form of apparatus of this invention.

In another form apparatus of this invention illustrated in FIG. 2 the illumination system 1' consists of separate optical fiber light conductors 12, 13, 14 and 15 arranged to receive illumination from a light suorce 1a' and conduct the light to their output ends 12b, 13b, 14b and 15b which are spaced apart in a row which is oplique relative to the slits of the diffraction gratings 4 and 5. As in the FIG. 1a embodiment a lens 3 is spaced from the row of the output ends 12b to 15b of the light conductors the amount of its focal length and light therefrom is projected through gratings 4 and 5 to lens 6 which focusses the diffraction images 12b', 13b', 14b' and 15b', corresponding to the light conductor output ends 12b to 15b, in the focal plane 7 of the lens 6. In this instance the several diffraction images are received through input ends 16a, 17a, 18a and 19a optical fiber light conductors 16, 17, 18 and 19 which are connected respectively to photoelectric receivers 20, 21, 22 and 23. The output ends 12b–15b of light conductors 12 to 15, and the corresponding input ends 16a to 19a of the light conductors 16 to 19, are spaced apart the above defined distance $a$. That is, their centers are the distance $a$ apart as projected on a reference line at right angles to the direction of the lengths of the slits of the gratings 4 and 5. The elements are dimensioned so that the sizes of the diffraction images 12b' to 15b' correspond to the sizes of the respective input ends 16a to 19a of the light conductors 16 to 19 which define the receiving surfaces of the receivers 20 to 23. The operation of this embodiment is the same as described above for the FIG. 1a embodiment.

The embodiment shown in FIG. 3 differs from the FIG. 1a embodiment primarily in that a lens 25 is added following the first grid 4 to project the image of the grating (the image plane of which in the FIG. 1a embodiment is defined by the surface of the output side of the grating 4) out from the surface of the grating 4 to a plane 4', which is the image plane of the grating 4 in this case. For the purpose of determining the appropriate distance $a$ between photoelectric receivers 26, 27, 28 and 29 of the embodiment by the above-described formula, the length of the optical path between the image plane 4' of the grating 4 and the grating 5, which length is designated Z in FIG. 3, is inserted for Z in the formula.

FIG. 4 shows another embodiment in which two diffractions gratings are combined as separate portions 30a and 30b of a single grating 30 which moves in successively opposite directions, indicated by the double headed arrow, in timed relation to the movements of a moving element (not shown) whose positions are to be tracked and measured. As in the FIG. 1a embodiment the grating 30 is connected to the moving element by conventional means (not shown). The portions 30a and 30b of the grating 30 correspond in function respectively to the gratings 4 and 5 of the FIG. 1a, FIG. 2 and FIG. 3 embodiments. In this instance, however, the image from the first grating portion 30a is projected by means of an optical system, consisting of a mirror 32, lenses 31a and 31b, and a mirror 33, to a plane 30a', which defines the image plane of the first grating portion 30a. This image plane 30a' is parallel to the second grating portion 30b and is spaced therefrom a distance $Z_2$, which is the length of the optical path therebetween, and which is the length inserted for A in the above-described formula for determining the distance $a$ by which the centers of the photoelectric receivers 34, 35, 36 and 37 of this embodiment are spaced apart in the focal plane 7 of the lens 6.

In the several embodiments the second, scanning, gratings are spaced from the first, measuring, gratings distances Z (FIGS. 1a and 2) $Z_1$ (FIG. 3) and $Z_2$ (FIG. 4), which distances are the lengths of the optical paths therebetween.

In the FIG. 3 and 4 embodiments, the illuminating systems 1 and the receivers 26 to 29 and 34 to 37 could be replaced by an illuminating system incorporating separate light conductors, as illustrated in the illuminating system 1' of FIG. 2.

The receivers 26 to 29 and 34 to 37 in the FIG. 3 and FIG. 4 embodiments, are shown in rows which extend at right angles to the directions of the lengths of the grating slits so that the distances $a$ between the receivers in their embodiments are the direct distances between the receivers. These embodiments operate in substantially the same manner as described for the FIG. 1a embodiment.

What is claimed is:

1. Apparatus for producing phase-shifted electric signals representing the positions of a moving element, comprising: similar first and second slit-type diffraction gratings arranged with their slits parallel, the first grating being adapted to move back and forth in line with the direction of the widths of its slits in correspondence with movements of said moving element, a light source arranged to direct light through the first grating, the second grating being arranged for light from the first grating to pass through it and being spaced so that the length of the optical path from the first grating or its projected image is spaced from the second grating, a first lens spaced to receive light from the second grating and to focus a diffraction image of the light source received therefrom, and a row of photoelectric receivers in the focal plane of said lens, the distance $a$ between the centers of said receivers as projected on a reference line that is at right angles to the direction of the lengths of the grating slits being $$a = \frac{wf\phi}{Z\pi Z}$$

where $w$ is the period length of the grating slit, Z is the length of the optical path from the first grating or its projected image to the second grating, $f$ is the focal length of said first lens, and $\phi$ is the desired phase shift of signals produced by the photoelectirc receivers, as measured in radians.

2. The apparatus of claim 1 in which said light source comprises means for producing light associated with a wall having an elongated aperture therethrough, and which includes a second lens, said means, said wall and said second lens being arranged for light from said means to pass through the aperture and be projected to the first grating by the second lens.

3. The apparatus of claim 2 in which the length of said aperture extends in a direction that is oblique relative to the direction of said reference line whereby the diffraction image of the light source produced at the focal plane of said first lens is oblique relative to the direction of said reference line.

4. The apparatus of claim 1 in which said light source comprises a number of optical fiber light conductors corresponding to the number of receivers, and means supplying light to the light conductors being arranged in a row corresponding to the row of receivers and being aligned to project light through said gratings in line for light therefrom to be received respectively by the receivers, the output ends of the light conductors and the receiving surfaces of the receivers being dimensioned for the diffraction images of the light conductors at the focal plane of the first lens to substantially correspond to the sizes of the receiving surfaces of the respective receivers.

5. The apparatus of claim 4 in which said rows of the output ends of the light conductors and the receivers are oblique relative to said reference line.

6. The apparatus of claim 1 which includes a lens at the opposite side of the first grating from the light source projecting an image of the first grating outward and thereby defining the image plane of the first grating at a plane spaced therefrom.

7. The apparatus of claim 1 in which the first and second gratings are separate portions of one elongated grating that is adapted to move back and forth in line with the direction of the widths of its slits in correspondence with movements of said moving element, and which includes mirror means and lens means at the opposite side of the first grating portion from the light source projecting an image of the first grating portion to an image plane parallel to the second grating portion.

References Cited

UNITED STATES PATENTS

| | | | |
|---|---|---|---|
| 3,153,111 | 10/1964 | Barber et al. | 356—169 |
| 3,330,964 | 7/1967 | Hobrough et al. | 250—231X |
| 3,427,463 | 2/1969 | Weyrauch | 250—237 |
| 3,483,389 | 12/1969 | Cronin | 250—231X |

WALTER STOLWEIN, Primary Examiner

U.S. Cl. X.R.

250—237, 216; 356—169